3,057,876
PROCESS FOR MAKING 2-(6-HYDROXY-2-ME-
THOXY - 3,4 - METHYLENEDIOXYPHENYL)BEN-
ZOFURAN
Arthur F. Wagner, Princeton, N.J., assignor to Merck &
Co., Inc., Rahway, N.J., a corporation of New Jersey
No Drawing. Filed Dec. 22, 1958, Ser. No. 782,322
4 Claims. (Cl. 260—340.5)

This invention relates to benzofurans and their synthesis. More particularly, this invention is directed to a synthesis of a compound having valuable antioxidant and vitamin-like properties and to various intermediates and their preparation.

This compound, described in an application of Forbes, Gyorgy and Zilliken, S.N. 527,784, now Patent Number 2,865,809, which has been isolated from yeast and shown to prevent the hemolysis of dialuric acid of erythrocytes from vitamin E deficient rats, has now been found to have the following structure:

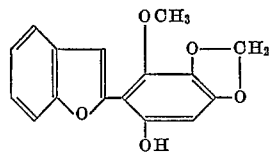

This compound and various derivatives thereof can be prepared by a series of reactions which may be carried out to give the desired compound in substantial yields. The synthesis involves the acid catalyzed condensation of a tri-oxy-substituted phenol, especially 3-methoxy-4,5-methylenedioxyphenol, with certain types of ortho-substituted phenylacetonitriles. The nitriles useful in this synthesis may be characterized generally as ortho-oxy-derivatives of phenylacetonitrile and more specifically as those phenylacetonitriles in which the ortho-oxy-substituent, whether ether or ester, is readily cleaved at the oxygen by hydrolysis or hydrogenolysis. Examples of such nitriles include o-acetoxyphenylacetonitrile, o-benzoyloxyphenylacetonitrile, o-(t-butyloxy)phenylacetonitrile, o-trimethylsilyloxyphenylacetonitrile, o-benzyloxyphenylacetonitrile, o-allyloxyphenylacetonitrile and o-propargyloxyphenylacetonitrile. The 3-methoxy-4,5-methylenedioxyphenol and most of the ortho-oxyphenylacetonitriles are new compounds.

3-methoxy-4,5-methylenedioxyphenol may be prepared from the known 3-methoxy-4,5-methylenedioxyaniline by means of diazotization followed by hydrolysis of the diazonium salt.

The ortho-oxyphenylacetonitriles may be prepared in one of two ways, either by substitution at the hydroxyl group of o-hydroxyphenylacetonitrile or by conversion of the appropriately ortho-oxy-substituted benzaldehyde to the corresponding cyanomethyl compound. The overall scheme of reaction is shown in the following series of equations, wherein the nitrile starting material is exemplified alternatively as o-acetoxyphenylacetonitrile and o-(t-butyloxy)phenylacetonitrile.

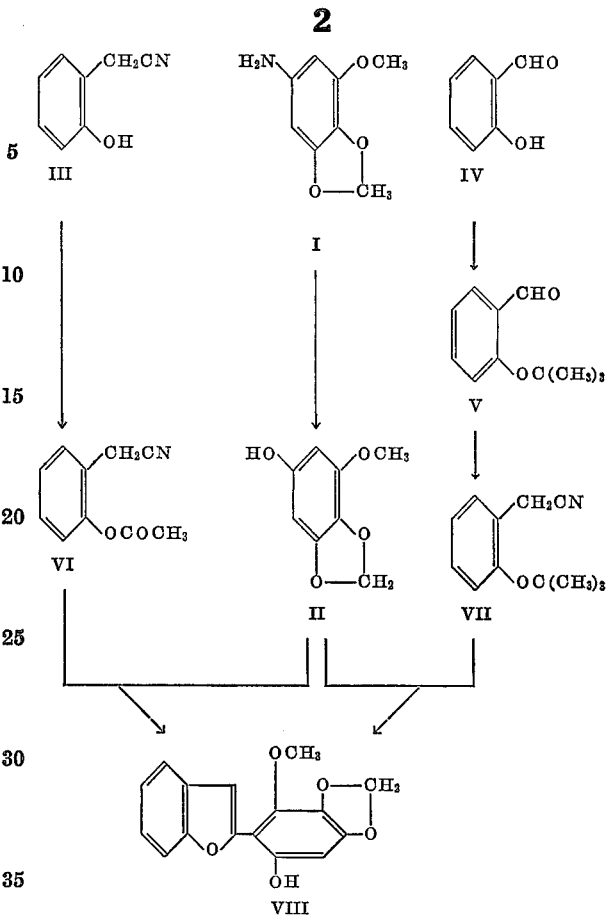

The preparation of 3-methoxy-4,5-methylenedioxyphenol (II) from 3-methoxy-4,5-methylenedioxyaniline (I) may be accomplished as follows. The substituted aniline is suspended in dilute acid, cooled and treated with a solution of sodium nitrite. The thus formed diazonium salt may be readily converted to the free phenol by hydrolysis. A preferred procedure for carrying out this hydrolysis is to treat the diazonium compound with hot water, steam, or superheated steam. Salts, such as cupric sulfate, sodium sulfate or the like, may be used to raise the temperature of the boiling reaction mixture in order to insure rapid hydrolysis. Other salts may be used for this purpose as well.

For the preparation of the o-oxyphenylacetonitrile, in the case of the acyloxy derivatives, the acylation of o-hydroxyphenylacetonitrile (III) may be conducted using any suitable acylating agent, such as acetyl chloride or acetic anhydride for the preparation of o-acetoxyphenylacetonitrile (VI). The reaction may be conducted at room temperature or higher temperatures may be used if desired. Preferably the reaction is run in the presence of a catalyst, such as pyridine, piperidine or a tertiary alkyl amine, for example, triethylamine. Generally no solvent is necessary, since either the acylating agent or the catalyst may serve as a solvent for the reaction.

In the case of the o-oxyphenylacetonitriles, not of the acyloxy series, which may be utilized for the preparation of the desired benzofuran derivative, for example, o-(t-butyloxy)-phenylacetonitrile (VII), the appropriate orthooxy-substituted benzaldehyde, in this case o-(t-butyloxy)-benzaldehyde (V) is caused to undergo a Claisen type reaction with rhodanine, in the presence of a sodium acetate and acetic acid catalyst, to give a Claisen type addition product, which upon alkaline hydrolysis, such as by reaction with sodium hydroxide and sodium sulfide, gives the corresponding thio acid. This acid then is converted to the oxime by reaction with hydroxylamine and then decarboxylated and dehydrated by reaction with a suitable dehydrating agent, such as acetic anhydride, to give the desired o-(t-butyloxy)-phenylacetonitrile (VII). The o-(t-butyloxy)benzaldehyde (V) starting material for this synthesis may be derived from salicylaldehyde (IV), by alkylation with isobutylene, for example. For this purpose a Lewis acid catalyst, such as boron trifluoride, may be used.

Other ortho-oxyphenylacetonitriles may be prepared by appropriate modification of either of these procedures. o-Trimethylsilyloxyphenylacetonitrile, for example, may be prepared by reaction of o-hydroxyphenylacetonitrile with trimethylchlorosilane in the presence of pyridine.

The condensation of 3-methoxy-4,5-methylenedioxyphenol (II) with the ortho-oxyphenylacetonitriles described above may be accomplished by means of a suitable acid catalyst. Catalysts which are satisfactory for this purpose include catalysts of the Lewis acid type such as zinc chloride, ferric chloride, aluminum chloride and boron trifluoride. Reaction is facilitated if the catalyst is used in the presence of an anhydrous acid such as hydrogen chloride. The condensation may be conducted at room temperature, but it is generally preferred to cool the reaction mixture.

The product of the condensation is then hydrolyzed to produce the desired benzofuran, 2-(6-hydroxy-2-methoxy-3,4-methylenedioxyphenyl)benzofuran (VIII). This hydrolysis may be suitably accomplished by dissolving the product in water and then heating the solution to facilitate the hydrolysis.

The product is isolated by extraction with ether and treated with an acid or a base depending on the nature of the oxy-substituent of the starting oxyphenylacetonitrile. The accompanying impurities may then be removed by sublimation in vacuo or by extraction of the product from the residue with chloroform. The remaining impurities can be extracted from the chloroform solution with bicarbonate. Final purification of the product is accomplished by chromatography on acid-washed aluminum oxide or a silicate, such as Florisil adsorbent.

The product, 2-(6-hydroxy-2-methoxy-3,4-methylenedioxyphenyl)benzofuran (VIII) has a melting point of about 118° C., and $R_f$ 0.83 using Whatman No. 1 paper with the system water:ethanol:concentrated ammonium hydroxide (37:5:8 and gives a red color with the Emmerie-Engel reagent (0.5% $\alpha,\alpha$-dipyridyl and 0.2% ferric chloride in ethanol).

The invention may be better understood by reference to the following examples which are intended for purposes of illustration only and are not intended as in any way limiting the scope of this invention which is defined in the appended claims.

EXAMPLE 1

3-Methoxy-4,5-Methylenedioxyphenol (II)

A suspension of 1.6 g. of 3-methoxy-4,5-methylenedioxyaniline (I) in 50 ml. of water is cooled in an ice bath. The mixture is acidified with 8 ml. of 4.5 N sulfuric acid and a solution of 0.7 g. of sodium nitrite in 6 ml. of water is added slowly to the stirred mixture. The unreacted nitrous acid is decomposed by the addition of urea.

The solution of diazo compound is added dropwise through a jet of steam into a boiling solution of 100 g. of cupric sulfate in 100 ml. of water. The aqueous mixture is cooled and extracted with two 200-ml. portions of ether. After the ether solution is dried over anhydrous magnesium sulfate and concentrated under reduced pressure, 1.2 g. of product is isolated. Distillation of the crude product in vacuo at 130° C., yields 530 mg. of the phenol, M.P. 89–93° C.

Recrystallization of the product from ether-petroleum ether gives pure 3-methoxy-4,5-methylenedioxyphenol (II), M.P. 89–91° C.

Analysis.—Calcd. for $C_8H_8O_4$ (168.14): C, 57.15; H, 4.80. Found: C, 57.55; H, 5.11.

EXAMPLE 2 o-Acetoxyphenylacetonitrile (VI)

A 5.5-g. sample of o-hydroxyphenylacetonitrile (III) is dissolved in 10 ml. of pyridine and 10 ml. of acetic anhydride is added. After being allowed to stand at room temperature for 16 hrs., the reaction mixture is poured onto a mixture of ice and dilute hydrochloric acid. The product is extracted with ether. The ether solution is dried and concentrated and the 6.2 g. of product obtained is purified by distillation in vacuo at 105–110° C.

Analysis.—Calcd. for $C_{10}H_9NO_2$ (175.18): C, 68.56; H, 5.18; N, 8.00. Found: C, 68.80; H, 5.27; N, 8.00.

$\lambda_{max.}^{Neat}$ 4.49, 5.7, 6.24 and 8.3$\mu$

EXAMPLE 3

2 - (6 - Hydroxy - 2 - Methoxy - 3,4 -Methylenedioxyphenyl)Benzofuran (VIII) From o-Acetoxyphenylacetonitrile (VI)

A mixture of 1.0 g. of 3-methoxy-4,5-methylenedioxyphenol (II), 1.05 g. of o-acetoxyphenylacetonitrile (VI) and 0.8 g. of freshly fused zinc chloride in 60 ml. of anhydrous ether is cooled in an ice-salt mixture. The stirred reaction mixture is saturated with anhydrous hydrogen chloride. Stirring is continued for 65 hrs. at about 5° C.

At the end of the reaction period the product which has separated is isolated by decanting the supernatant ether solution. This product is dissolved in 50 ml. of water and the solution is heated on the steam bath for 1 hr. After the aqueous mixture is cooled to room temperature, the product is isolated by extraction with ether. Concentration of the ether extract gives 1.11 g. of product.

The product is treated at room temperature with 10 ml. of 1 N sodium hydroxide and 10 ml. of methanol for 20 min. After the alkaline mixture is acidified, it is extracted with ether. 1.05 g. of product is obtained by concentration of the ether extract and is purified by distilling off the accompanying o-hydroxyphenylacetic acid at 110–120° C. in vacuo.

The purified residue is dissolved in about 5 ml. of chloroform and the solution is chromatographed on 30 g. of acid-washed alumina. The column is eluted with chloroform and 0.25 g. of product is isolated from the first 60 ml. of eluate. The product is dissolved in 5 ml. of benzene and is purified by chromatography on 30 g. of Florisil adsorbent. Elution of the column with a mixture of equal volumes of benzene and petroleum ether gives 170 mg. of 2-(6-hydroxy-2-methoxy-3,4-methylenedioxyphenyl)benzofuran (VIII), M.P. 118.0–118.5° C.

This product upon paper chromatography on Whatman No. 1 paper using the system water:ethanol:concentrated ammonium hydroxide (37:5:8) was found to have $R_f$ 0.83. It gave a red color with the Emmerie-Engel reagent (0.5% $\alpha,\alpha$-dipyridyl and 0.2% ferric chloride in ethanol). The infrared spectrum was found to be identical to that of the naturally derived product.

EXAMPLE 4 o-(t-Butyloxy)Benzaldehyde (V)

A mixture of 122 g. of salicylaldehyde (IV), 100 ml. of benzene and 5 g. of boron trifluoride is cooled to 0° C. Isobutylene is passed into the cooled solution at the rate of 10 g. per hour until the theoretical amount (56 g.) is absorbed. The system is kept under pressure (about 10 cm. of mercury) and the temperature is kept at 0° C. for the duration of the reaction. After the reaction mixture is washed with cold 10% aqueous potassium hydroxide to remove unreacted starting material, the benzene solution is dried and concentrated. The product may be further purified by distillation in vacuo.

EXAMPLE 5 o-(t-Butyloxy)Phenylacetonitrile (VII)

A mixture of 36 g. of o-(t-butyloxy)benzaldehyde (V), 27 g. of rhodanine, 100 g. of sodium acetate and 200 ml. of glacial acetic acid is heated on the steam cone for 1 hour. The reaction mixture is cooled, poured into 300 ml. of cold water, and the product is isolated by filtration. The product is washed with water and dried. The product is dissolved in 250 ml. of 15% sodium hydroxide and 50 ml. of 20% sodium sulfide by heating the mixture on the steam bath. After 10 minutes, the mixture is acidified to pH 2 and filtered. The product is washed with water, dried and treated with a mixture of 42 g. of hydroxylamine hydrochloride, 200 ml. of water, 600 ml. of ethanol, and 33 g. of potassium hydroxide. The reaction mixture is refluxed for 2 hours, cooled, acidified and then extracted with ether. The product is purified by extraction into aqueous sodium bicarbonate solution; the product is recovered by acidification of the bicarbonate extract followed by extraction with ether. The ether extract is dried and concentrated and the product is added in portions to 30 ml. of acetic anhydride at about 40° C. The solution is warmed for a few minutes on the steam bath and then added to 75 ml. of water. The mixture is warmed to accelerate the decomposition of acetic anhydride. The product, o-(t-butyloxy)phenylacetonitrile (VII), is isolated by extraction with ether and is purified by crystallization or distillation.

EXAMPLE 6

2 - (6-Hydroxy-2-Methoxy - 3,4 - Methylenedioxyphenyl) Benzofuran (VIII) From o - (t - Butyloxy)Phenylacetonitrile A mixture of 1 g. of 3-methoxy-4,5-methylenedioxyphenol (II), 1.1 g. of o-(t-butyloxy)phenylacetonitrile (VII), 0.8 g. of fused zinc chloride and 60 ml. of anhydrous ether is stirred and cooled to 0° C. The mixture is saturated with anhydrous hydrogen chloride and then stirred for two days at 0° C. The product is isolated by decantation of the supernatant ether and dissolved in water. The aqueous solution is warmed on the steam bath for one hour. The product, isolated by ether extraction, is dissolved in a mixture of 10 ml. of acetic acid and 3 ml. of concentrated hydrochloric acid. The mixture is warmed for 15 minutes and the solution is concentrated in vacuo. The product is extracted with chloroform and purified by chromatography on acid-washed alumina to give pure 2(6-hydroxy-2-methoxy-3,4-methylenedioxyphenyl)benzofuran (VIII), M.P. 118–118.5° C.

EXAMPLE 7 o-Trimethylsilyloxyphenylacetonitrile

A solution of 13 g. of o-hydroxyphenylacetronitrile (III) in 50 ml. of pyridine is cooled and stirred while 11 g. of trimethylchlorosilane is added dropwise. After being allowed to stand at room temperature for 4 hours, the reaction mixture is concentrated in vacuo. The product may be further purified by distillation or by crystallization from nonhydroxylic solvents.

EXAMPLE 8

2 - (6-Hydroxy-2-Methoxy - 3,4 - Methylenedioxyphenyl)- Benzofuran (VIII) From o-Trimethylsilyloxy Phenylacetonitrile A mixture of 5 g. of 3-methoxy-4,5-methylenedioxyphenol (II), 6 g. of o-trimethylsilyloxyphenylacetonitrile, 4 g. of anyhdrous zinc chloride and 200 ml. of anhydrous ether is stirred and cooled to 0° C. Anhydrous hydrogen chloride is passed into the solution until it is saturated with respect to hydrogen chloride. The reaction mixture is then stirred at 5° C. for 60 hours. The complex which separates is isolated by decantation and hydrolyzed in water at 100° C. The aqueous mixture is cooled and extracted with ether. The ether solution is dried and concentrated and the residue is extracted with chloroform. The chloroform extract is purified by chromatography on acid-washed alumia using chloroform for elution. Concentration of the chloroform eluate gives a crystalline product which may be further purified by chromatography on Florisil adsorbent using benzene-petroleum ether (1:1) for elution to yield pure 2-(6-hydroxy-2-methoxy-3,4-methylenedioxyphenyl)benzofuran (VIII), M.P. 118–118.5° C.

EXAMPLE 9 o-Benzoyloxyphenylacetonitrile

Five grams of o-hydroxyphenylacetonitrile (III) is dissolved in 15 ml. of pyridine and 8 g. of benzoyl chloride is added. After being allowed to stand for 16 hours at room temperature, the reaction mixture is poured onto ice. After fifteen minutes the mixture is acidified to pH 3 and extracted with chloroform. The chloroform extract is washed with aqueous sodium bicarbondate, dried over anhydrous magnesium sulfate and concentrated in vacuo. The product, o-benzoyloxyphenylacetonitrile may be further purified by distillation.

EXAMPLE 10

2 - (6-Hydroxy-2-Methoxy - 3,4 - Methylenedioxyphenyl)- Benzofuran (VIII) From o-Benzoyloxyphenylacetonitrile A mixture of 1.7 g. of 3-methoxy-4,5-methylenedioxyphenol (II), 2.3 g. of o-benzoyloxyphenylacetonitrile, 1.5 g. of fused zinc chloride and 100 ml. of anhydrous ether is stirred and cooled to 0° C. The mixture is saturated with anhydrous hydrogen chloride and then stirred for 2 days at 5° C. The product is isolated by decantation. The product is dissolved in water and the solution is heated on the steam bath for one hour, cooled and extracted with ether. The ether solution is concentrated in vacuo and the residue is dissolved in 10 ml. of methanol; 10 ml. of 1 N sodium hydroxide is added, and the mixture is warmed on the steam bath for 20 minutes. The solution is acidified and concentrated in vacuo and the residue is extracted with ether. The ether solution is washed with aqueous sodium bicarbonate, dried over magnesium sulfate and concentrated in vacuo. The product is purified by chromatography on Florisil adsorbent using benzene-petroleum ether (1:1) for elution. 2-(6-hydroxy-2-methoxy - 3,4 - methylenedioxyphenyl)benzofuran (VIII), M.P. 118–118.5° C., is obtained by concentration of the eluate.

EXAMPLE 11

2 - (6-Hydroxy-2-Methoxy - 3,4 - Methylenedioxyphenyl)- Benzofuran (VIII) From o-Benzyloxyphenylacetonitrile A mixture of 1.0 g. of 3-methoxy-4,5-methylenedioxyphenol (II), 1.3 g. of o-benzyloxyphenylacetonitrile, 0.8 g. of freshly fused zinc chloride and 70 ml. of anhydrous ether is stirred and cooled to 0° C. The mixture is saturated with anhydrous hydrogen chloride and then stirred for about 2 days at 5° C. The reaction mixture is poured onto ice and the cold aqueous phase is isolated and then warmed on a steam cone for one hour. The aqueous mixture is cooled and extracted with ether. The ether solution is washed with aqueous potassium bicarbonate, dried over anhydrous magnesium sulfate, and concentrated. The product is purified by chromatography on Florisil adsorbent using benzene-petroleum ether (1:1) for elution. 2-(6 - hydroxy-2 - methoxy-3,4 - methylenedioxyphenyl)benzofuran (VIII), M.P. 118–118.5° C., is obtained by concentration of the eluate.

Various changes and modifications of the invention can be made, and to the extent that such variations incorporate the spirit of the instant invention, they are intended to be included within the scope of the appended claims.

What is claimed is:

1. A process for the synthesis of 2-(6-hydroxy-2-methoxy - 3,4 - methylenedioxyphenyl)benzofuran which comprises condensing 3-methoxy - 4,5 - methylenedioxyphenol with a compound having the structural formula

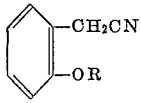

wherein R is a member selected from the group consisting of acetyl, benzoyl, t-butyl, trimethylsilyl, benzyl, allyl and propargyl, in the presence of a Lewis acid catalyst and thereafter hydrolyzing the product to produce the desired 2-(6-hydroxy-2-methoxy-3,4-methylenedioxyphenyl)benzofuran.

2. A process for the synthesis of 2-(6-hydroxy-2-methoxy-3,4 - methylenedioxyphenyl)benzofuran which comprises reacting 3-methoxy-4,5-methylenedioxyphenol with o-acetoxyphenylacetonitrile, in the presence of a mixture of zinc chloride and hydrogen chloride, and thereafter hydrolyzing the product to produce the desired 2-(6-hydroxy - 2 - methoxy-3,4 - methylenedioxyphenyl)-benzofuran.

3. A process for the synthesis of 2-(6-hydroxy-2-methoxy-3,4-methylenedioxyphenyl) benzofuran which comprises condensing 3-methoxy - 4,5-methylenedioxyphenol with o-benzyloxyphenylacetonitrile, in the presence of a mixture of zinc chloride and hydrogen chloride, and thereafter hydrolyzing the product to produce the desired 2-(6-hydroxy-2-methoxy-3,4-methylenedioxyphenyl) benzofuran.

4. The process of claim 1 wherein the catalyst is a mixture of zinc chloride and hydrogen chloride.

References Cited in the file of this patent

UNITED STATES PATENTS

| | | |
|---|---|---|
| 2,438,694 | Cross | Mar. 30, 1948 |
| 2,548,852 | Archer | Apr. 17, 1951 |
| 2,580,459 | Papa et al. | Jan. 1, 1952 |
| 2,703,329 | Schultz | Mar. 1, 1955 |
| 2,713,065 | Rorig | July 12, 1955 |
| 2,757,208 | Burkhard | July 31, 1956 |
| 2,769,816 | Kartinos et al. | Nov. 6, 1956 |
| 2,787,627 | Kuriyagawa et al. | Apr. 2, 1957 |
| 2,789,985 | Harrison | Apr. 23, 1957 |
| 2,865,809 | Forbes et al. | Dec. 23, 1958 |
| 2,879,297 | Prill et al. | Mar. 24, 1959 |

OTHER REFERENCES

Salway: Chemical Society Journal (London), page 1162 (1909).

Wagner Zook: Synthetic Organic Chemistry, pages 167–8 (1953).

Meisinger et al.: J. Am. Chem. Soc., vol. 81, pages 4979–4982 (1959).